(12) United States Patent
Watanabe et al.

(10) Patent No.: US 11,825,192 B2
(45) Date of Patent: Nov. 21, 2023

(54) IMAGE SENSOR

(71) Applicant: OMRON Corporation, Kyoto (JP)

(72) Inventors: Kosuke Watanabe, Kyoto (JP); Yasuhito Uetsuji, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 270 days.

(21) Appl. No.: 17/604,620

(22) PCT Filed: Mar. 16, 2020

(86) PCT No.: PCT/JP2020/011426
§ 371 (c)(1),
(2) Date: Oct. 18, 2021

(87) PCT Pub. No.: WO2020/217777
PCT Pub. Date: Oct. 29, 2020

(65) Prior Publication Data
US 2022/0201200 A1    Jun. 23, 2022

(30) Foreign Application Priority Data

Apr. 26, 2019   (JP) .................................. 2019-085510

(51) Int. Cl.
*H04N 23/60*    (2023.01)
*G06T 7/62*    (2017.01)
(Continued)

(52) U.S. Cl.
CPC ............... *H04N 23/64* (2023.01); *G02B 3/14* (2013.01); *G06T 1/60* (2013.01); *G06T 7/62* (2017.01); *H04N 23/54* (2023.01); *H04N 23/55* (2023.01)

(58) Field of Classification Search
CPC ........ H04N 23/64; H04N 23/54; H04N 23/55; H04N 23/56; H04N 23/61; H04N 23/663;
(Continued)

(56) References Cited

U.S. PATENT DOCUMENTS 7,233,351 B1    6/2007 Knighton et al.
2006/0098114 A1    5/2006 Horii
(Continued)

FOREIGN PATENT DOCUMENTS

| JP | 2010262246 A | 11/2010 |
|---|---|---|
| JP | 2011530722 A | 12/2011 |
| WO | 2011052770 A1 | 5/2011 |

OTHER PUBLICATIONS

International Search Report issued in Intl. Appln. No. PCT/JP2020/011426 dated Jun. 2, 2020. English translation provided.
(Continued)

*Primary Examiner* — Gevell V Selby
(74) *Attorney, Agent, or Firm* — ROSSI, KIMMS & McDOWELL LLP

(57) ABSTRACT

An image sensor includes a body module including a refractive power controller that adjusts an application voltage applicable to a liquid lens in a lens module to control a refractive power of the liquid lens, a recognition processor that analyzes, after a preset period elapses from when the refractive power controller changes the application voltage to the liquid lens, image data from an imaging device in an imaging module, and an adjuster that reads first information from a memory in the lens module and second information from a memory in the imaging module and adjusts, based on the first and second information, the preset period to a period corresponding to a combination of the lens module and the imaging device. The first information indicates a specifica- (Continued)

tion for or a type of the lens module. The second information indicates a specification for or a type of the imaging device.

8 Claims, 5 Drawing Sheets

(51) Int. Cl.
    *G02B 3/14*     (2006.01)
    *G06T 1/60*     (2006.01)
    *H04N 23/54*     (2023.01)
    *H04N 23/55*     (2023.01)

(58) Field of Classification Search
    CPC ...... H04N 23/67; H04N 23/75; H04N 17/002; G02B 3/14; G02B 7/08; G02B 7/36; G06T 1/60; G06T 7/62; G03B 2205/0084; G03B 2206/00; G03B 2217/005; G03B 3/10
See application file for complete search history.

(56) References Cited

U.S. PATENT DOCUMENTS

| | | |
|---|---|---|
| 2007/0279365 A1 | 12/2007 | Kageyama |
| 2011/0200314 A1 | 8/2011 | Kawashima |
| 2012/0024954 A1 | 2/2012 | Komi |
| 2012/0261474 A1 | 10/2012 | Kawashime |
| 2013/0258171 A1 | 10/2013 | Kikuchi et al. |
| 2017/0090076 A1 | 3/2017 | Nunnink |

OTHER PUBLICATIONS

Written Opinion issued in Intl. Appln. No. PCT/JP2020/011426 dated Jun. 2, 2020. English translation provided.

Extended European Search Report issued in European Appln. No. 20795535.2 dated Nov. 23, 2022.

| | CM-A | CM-B | CM-C | CM-D |
|---|---|---|---|---|
| LM-A | 50 ms | 100 ms | 100 ms | 200 ms |
| LM-B | 75 ms | 150 ms | 150 ms | 250 ms |

IMAGE SENSOR

FIELD

The present invention relates to an image sensor including a body module to which a lens module including a liquid lens and an imaging module are attachable.

BACKGROUND

Known small sensor systems capture images of inspection targets and analyze the captured images to inspect and measure the inspection targets. Such sensor systems (hereafter, image sensors) typically change the positions of selected lenses along the optical axis mechanically to adjust the focus. Some image sensors include liquid lenses to adjust the focus (refer to, for example, Patent Literature 1). A liquid lens is an optical component containing a conductive water solution and a nonconductive oil sealed in a lens holder, with the oil-water interface deforming to change the refractive power in response to a voltage applied.

CITATION LIST

Patent Literature

Patent Literature 1: U.S. Patent Application Publication No. 2017/0090076

SUMMARY

Technical Problem

The use of a liquid lens eliminates a lens moving unit and allows the optical system to be compact. Image sensors are expected to have parameters (e.g., the angle of view and the number of pixels of captured images) that may differ depending on users. For an image sensor including an optical system with a liquid lens, the optical system and the imaging device in the image sensor may be modularized to allow a user to select an optical system and an imaging device as appropriate.

For an image sensor including a liquid lens, the voltage applied to the liquid lens is adjusted to change the refractive power. Although the liquid lens may have the refractive power that allows light collected by the optical system with the liquid lens to have a blur circle diameter smaller than or equal to the pixel pitch for an image in focus, a certain period of time is taken from a change in the application voltage to the liquid lens to a change in the refractive power that causes light collected by the optical system with the liquid lens to have a blur circle diameter smaller than or equal to the pixel pitch. In an image sensor including an optical system with a liquid lens, image capturing is to be delayed by a predetermined period after the application voltage to the liquid lens is changed. The blur circle diameter changes differently in response to a change in the application voltage to the liquid lens depending on the lens module selected. A different pixel pitch is set for a different imaging module. Thus, the period taken from a change in the application voltage to the liquid lens to achieving the focus of the image differs depending on the combination of the lens module and the imaging module. Using the same wait period uniformly for any combination of a lens module and an imaging module can produce a blurred image through image capturing performed before the focus is achieved, or may cause an excess wait period after the focus is achieved.

In response to this, a modularized image sensor may use, for any combinations of modules, a specific wait period (hereafter, a predefined wait period) defined as appropriate for a combination of a specific lens module (hereafter, a reference lens module) and a specific imaging device (hereafter, a reference imaging device). The image sensor with this structure may use a selected combination of a lens module less responsive to a change in the application voltage than the reference lens module and an imaging device having a smaller pixel pitch than the reference imaging device. This image sensor may take a longer period from the voltage application to achieving the focus of the image than the predefined wait period, thus producing a blurred and less accurate captured image. The image sensor may use a selected combination of a lens module more responsive to a change in the application voltage than the reference lens module and an imaging device having a larger pixel pitch than the reference imaging device. This image sensor may take a shorter period from the voltage application to achieving the focus of the image than the predefined wait period, thus causing an excess wait period from the voltage application to the image capturing.

In response to the above issue, one or more aspects of the present invention are directed to an image sensor that adjusts the wait period after a change in the application voltage to a liquid lens as appropriate for a combination of a lens module and an imaging module attached to a body module.

Solution to Problem

An image sensor according to one aspect of the present invention includes a body module to which a lens module and an imaging module are attachable. The body module includes a refractive power controller, a recognition processor, and an adjuster. The refractive power controller adjusts an application voltage applicable to a liquid lens included in the lens module to control a refractive power of the liquid lens. The recognition processor analyzes image data from an imaging device included in the imaging module to recognize predetermined information about a subject. The recognition processor analyzes the image data after a preset period elapses from when the refractive power controller changes the application voltage to the liquid lens. The adjuster reads first information from a memory included in the lens module and second information from a memory included in the imaging module and adjusts, based on the read first information and the read second information, the preset period to a period corresponding to a combination of the lens module and the imaging device. The first information indicates a specification for the lens module or a type of the lens module. The second information indicates a specification for the imaging device or a type of the imaging device.

More specifically, the lens module for the image sensor includes the memory storing first information indicating the specification for or the type of the lens module. The imaging module for the image sensor includes the memory storing second information indicating the specification for or the type of the imaging device included in the imaging module. The body module in the image sensor includes the adjuster that adjusts, based on the first information and the second information read from the memories in the modules, the preset period to a period corresponding to a combination of the lens module and the imaging device. The image sensor thus adjusts the wait period (preset period) after a change in the application voltage to the liquid lens as appropriate for a combination of the lens module and the imaging module attached to the body module.

The first information stored in the memory in the lens module and indicating the specification for or the type of the lens module may be any information that can identify the specification for or the type of the liquid lens included in the lens module. The second information stored in the memory in the imaging module may also be any information that can identify the specification for or the type of the imaging device. Thus, the first information may include lens module format information indicating a format of the lens module. The second information may include imaging module format information indicating a format of the imaging module.

The first information may include blur circle diameter information indicating a change in a blur circle diameter with time after the application voltage is applied to the liquid lens. The second information may include pixel pitch information indicating a pixel pitch of the imaging device. For the first information being blur circle diameter information, the adjuster may determine, based on the obtained blur circle diameter information and the obtained pixel pitch information, an elapsed period after the application voltage is applied to allow the blur circle diameter to be smaller than or equal to the pixel pitch indicated by the pixel pitch information, and adjust the preset period based on the determined elapsed period. The blur circle diameter information may include one or more coefficients in a relational expression indicating the change in the blur circle diameter with time after the application voltage is applied to the liquid lens.

The adjuster may transmit a predetermined request including the first information and the second information to an external device, obtain a period recommended as the preset period from the external device, and adjust the preset period to the obtained recommended period. The body module may include a storage storing a period recommended as the preset period for each of a plurality of combinations of the first information and the second information. The adjuster in the body module may read, from the storage, the recommended period associated with one of the plurality of combinations of the first information and the second information, and adjust the preset period to the read recommended period.

Advantageous Effects

The image sensor according to the above aspects of the present invention adjusts the wait period after a change in the application voltage to a liquid lens as appropriate for a combination of a lens module and an imaging module attached to a body module.

DETAILED DESCRIPTION

Embodiments of the present invention will now be described with reference to the drawings.

First Embodiment

Figure 1:
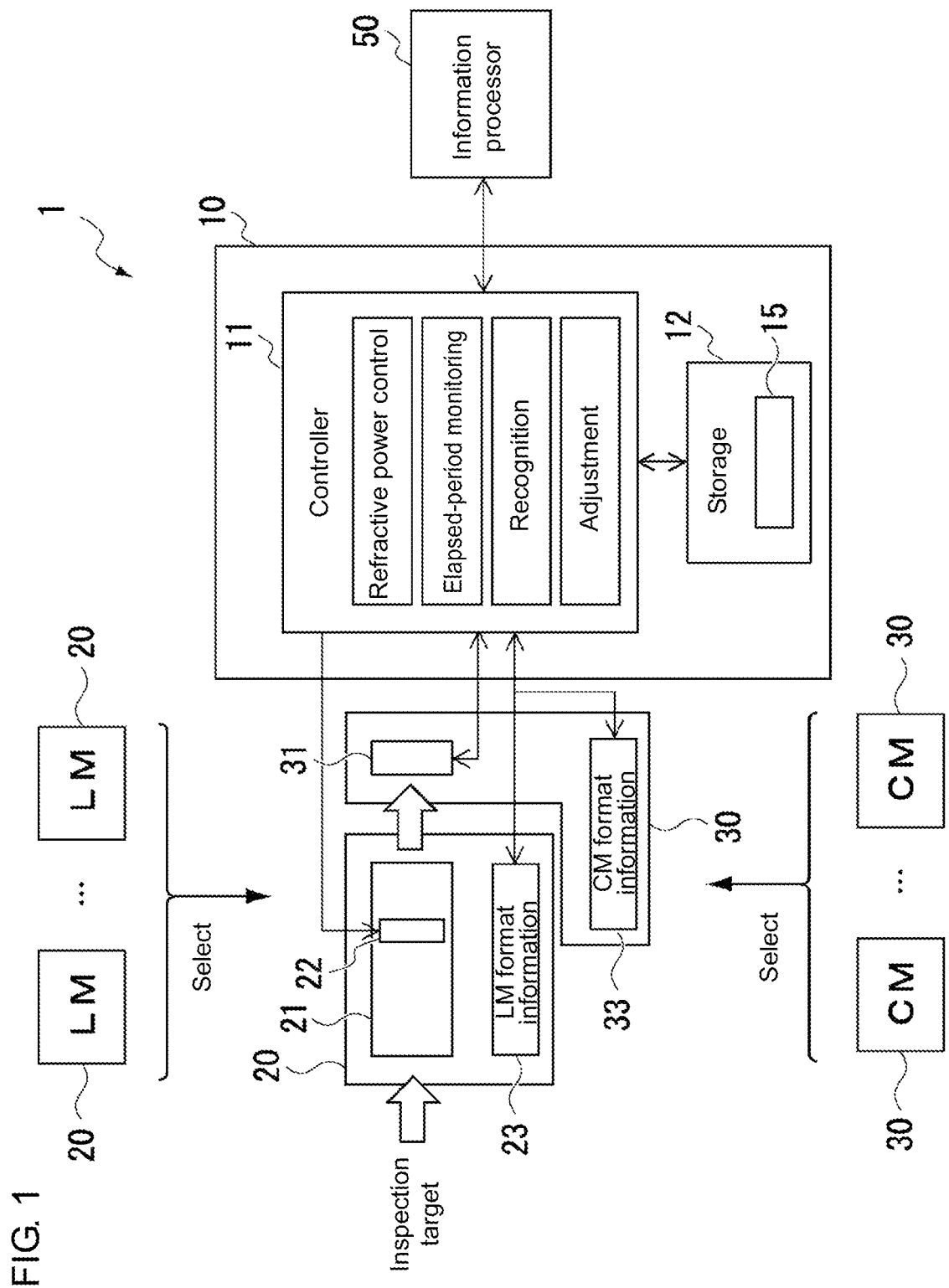
FIG. 1 is a diagram of an image sensor according to a first embodiment of the present invention.

FIG. 1 is a diagram of an image sensor 1 according to a first embodiment of the present invention.

As shown in the figure, the image sensor 1 according to the present embodiment includes a body module 10 to which a lens module selected from multiple lens modules (LMs) 20 and an imaging module selected from multiple imaging modules (CMs) 30 are attachable. The image sensor 1 is connected to an information processor 50 when in use. The information processor 50 is a computer with a program for using the image sensor 1 installed. The information processor 50 is typically connected to multiple image sensors 1.

Each imaging module 30 includes an imaging device 31 (monochrome image sensing device in the present embodiment), such as a complementary metal-oxide-semiconductor (CMOS) image sensing device or a charge-coupled device (CCD) image sensing device. An imaging module 30 to be attached to the body module 10 can be selected from multiple imaging modules 30 each including an imaging device 31 with different specifications (e.g., the pixel pitch and the number of pixels). Each imaging module 30 includes a nonvolatile memory 33, such as a serial electrically erasable programmable read-only memory (EEPROM), storing imaging module format information (hereafter, CM format information) indicating the format of the imaging module 30.

Each lens module 20 includes an optical system 21 (a combination of lenses) including a liquid lens 22. A lens module 20 can be selected from multiple lens modules 20 each including an optical system 21 with different specifications (e.g., the type of the liquid lens 22 in the optical system 21). Each lens module 20 includes a nonvolatile memory 23, such as a serial EEPROM, storing lens module format information (hereafter, LM format information) indicating the format of the lens module 20.

The body module 10, to which a lens module 20 and an imaging module 30 are attachable, includes a controller 11 and a storage 12.

The controller 11 performs a refractive power control process, an elapsed-period monitoring process, a recognition process, and an adjustment process (described in detail later). The controller 11 includes, for example, a driver integrated circuit (IC) for generating an application voltage to the liquid lens 22 and a microcontroller.

The storage 12 stores various items of information. The storage 12 includes a random-access memory (RAM) to be used as a work area by the controller 11 and a nonvolatile memory such as a flash memory. The nonvolatile memory in the storage 12 stores a wait period table 15 (described in detail later).

The refractive power control process, the elapsed-period monitoring process, the recognition process, and the adjustment process to be performed by the controller 11 will now be described one after another.

The refractive power control process refers to adjusting the application voltage to the liquid lens 22 to control the refractive power of the liquid lens 22. The controller 11 performs the refractive power control process in response to an instruction from the information processor 50 for changing the installation distance. The installation distance refers to the distance from the front end of the optical system 21 to the inspection target. In the refractive power control process, the controller 11 determines the voltage to be applied to the liquid lens 22 based on an installation distance (an installation distance after a change) designated by the instruction for changing the distance. The controller 11 then applies the determined voltage to the liquid lens 22.

The elapsed-period monitoring process is started by the controller 11 at the start of the refractive power control process (or in other words, in response to a change in the application voltage to the liquid lens 22). In the elapsed-period monitoring process, the controller 11 first sets a waiting completion flag (its use will be described later) to 1. The controller 11 then starts measuring the elapsed period after the change in the application voltage. In response to the elapsed period reaching a preset wait period, the controller 11 changes the waiting completion flag to 0 and ends the elapsed-period monitoring process. The preset wait period is a parameter determined by the adjustment process to be used in the elapsed-period monitoring process and the recognition process. The preset wait period is described in detail later with the adjustment process.

Figure 2:
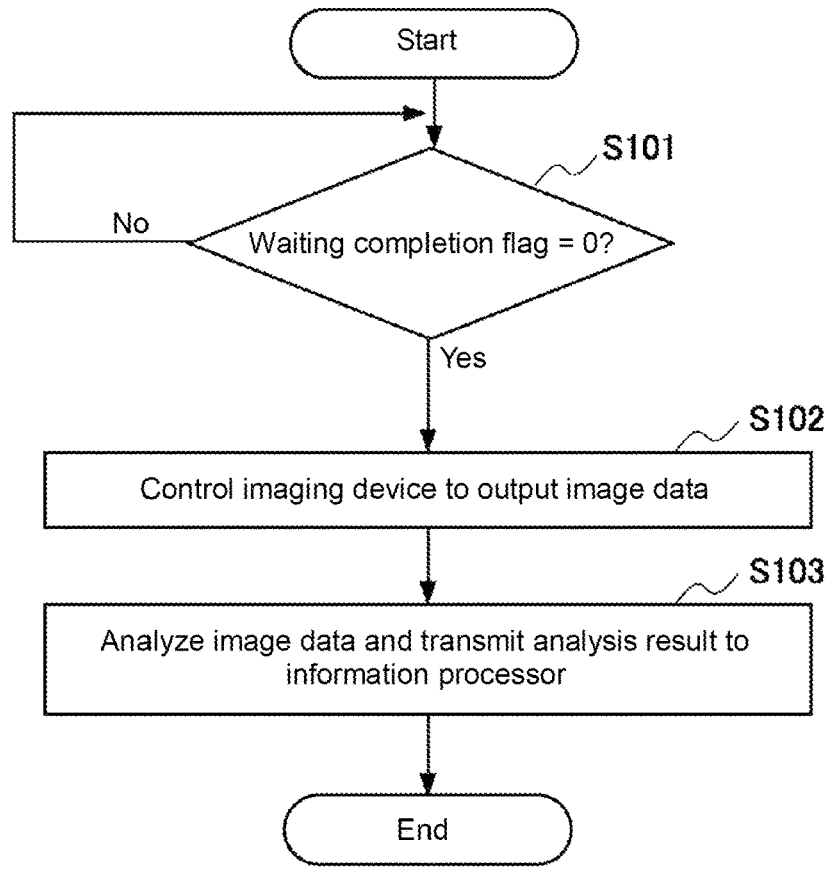
FIG. 2 is a flowchart of a recognition process performed by a controller in the image sensor according to the first embodiment.

The recognition process shown in FIG. 2 is performed by the controller 11 in response to a predetermined instruction from the information processor 50.

More specifically, the controller 11 starting the recognition process in response to the predetermined instruction first determines whether the waiting completion flag has been set to 0 (step S101). In response to the waiting completion flag set to 0 (Yes in step S101), the controller 11 controls the imaging device 31 to output image data (step S102). The controller 11 then analyzes the image data from the imaging device 31 and transmits the analysis result to the information processor 50 (step S103). The analysis performed by the controller 11 in step S103 is intended for, for example, the recognition of a character string printed on an inspection target or the detection of the position of a label on an inspection target. Upon completing step S103, the controller 11 ends the recognition process (FIG. 2).

In response to the waiting completion flag not set to 0 (No in step S101), the controller 11 waits in step S101 until the waiting completion flag is set to 0. In response to the waiting completion flag set to 0 (Yes in step S101), the controller 11 performs step S102 and the subsequent step.

As in the elapsed-period monitoring process detailed above, the waiting completion flag indicates a value other than 0 (specifically, 1) simply in the period from when the application voltage to the liquid lens 22 is changed to when the preset wait period has elapsed. In the recognition process (FIG. 2), image data is analyzed (step S103) after at least the preset wait period elapses from the change in the application voltage to the liquid lens 22.

The adjustment process is performed by the controller 11 when the image sensor 1 is turned on for adjusting the preset wait period as appropriate for the combination of the lens module 20 and the imaging module 30 attached to the body module 10.

Figure 3:
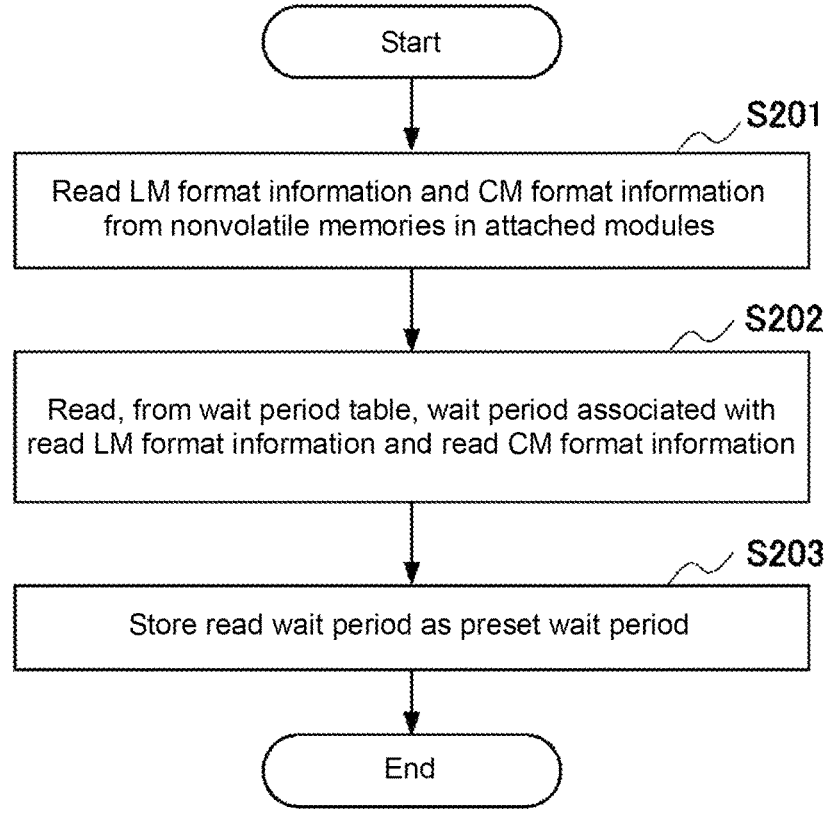
FIG. 3 is a flowchart of an adjustment process performed by the controller in the image sensor according to the first embodiment.
Figure 4:
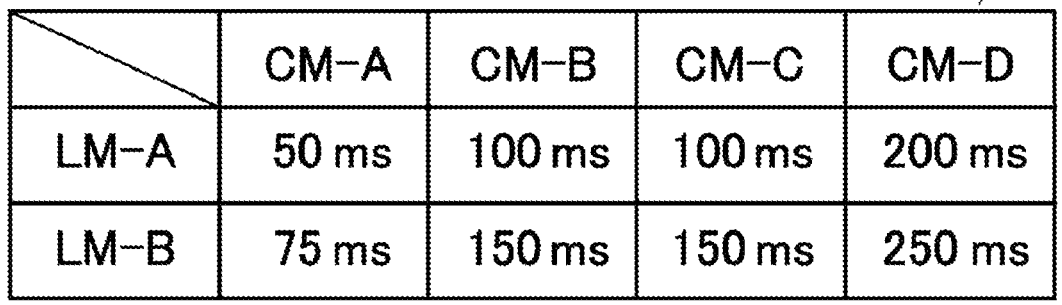
FIG. 4 is an example wait period table.

The adjustment process will now be described with reference to FIGS. 3 and 4. FIG. 3 is a flowchart of the adjustment process. FIG. 4 is an example of the wait period table 15. The lens module 20 having LM format information LM-X (X=A, B) is hereafter referred to as an LM 20X. The imaging module 30 having CM format information CM-Y (Y=A to D) is hereafter referred to as a CM 30Y.

In the adjustment process, the controller 11 first reads LM format information from the nonvolatile memory 23 and CM format information from the nonvolatile memory 33 in the modules attached to the body module 10 (step S201), as shown in FIG. 3. The controller 11 then reads, from the wait period table 15, the wait period associated with the read LM format information and the read CM format information (step S202). The controller 11 then stores the read wait period as a preset wait period (step S203) and ends the adjustment process.

The wait period table 15 (FIG. 4) stores a wait period (e.g., 50 ms) for each combination of LM format information (e.g., LM-A) and CM format information (e.g., CM-A).

For the image sensor 1 including the LM 20X and the CM 30Y, the wait period table 15 stores a wait period in association with LM-X and CM-Y. This wait period refers to the period taken for the optical system 21 to have a blur circle diameter matching the pixel pitch of the imaging device 31 in the CM 30Y after a change in the application voltage to the liquid lens 22. As described above, the adjustment process includes reading, from the wait period table 15, the wait period associated with the LM format information and the CM format information about the modules attached to the body module 10, and storing the read wait period as a preset wait period. The image sensor 1 thus adjusts the preset wait period as appropriate for the combination of the lens module 20 and the imaging module 30 attached to the body module 10.

The above procedure can adjust the preset wait period as appropriate for the combination of the lens module 20 and the imaging module 30 attached to the body module 10 for the reasons described below.

Figure 5:
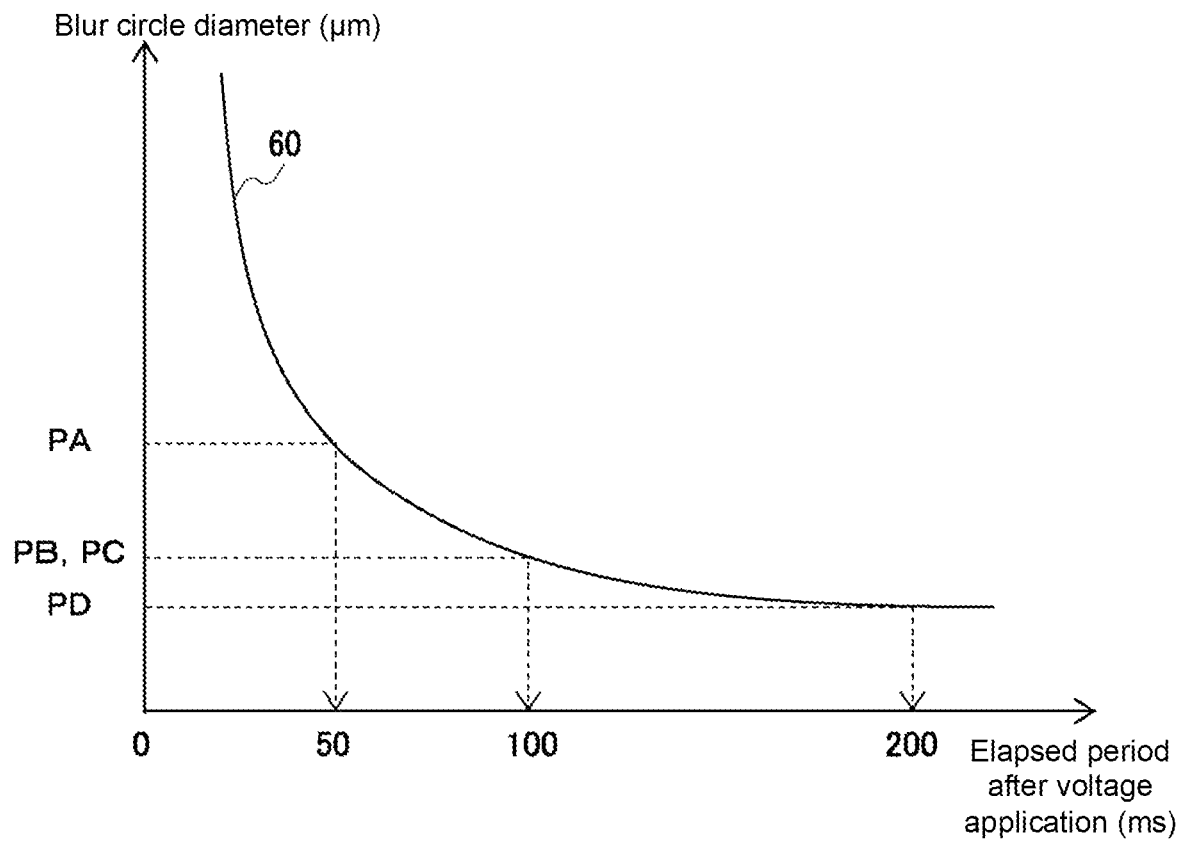
FIG. 5 is a graph showing the relationship between the elapsed period after the voltage application to a liquid lens and the blur circle diameter.

In response to a change in the application voltage to the liquid lens 22, the refractive power of the liquid lens 22 gradually approaches a target refractive power (the refractive power corresponding to the application voltage after the change). The blur circle diameter of the optical system 21 including the liquid lens 22 thus decreases with time after voltage application, as indicated by a curve 60 in FIG. 5. The curve 60 is associated with the optical system 21 in the LM 20A. In FIG. 5, PY (Y=A to D) is the pixel pitch of the imaging device 31 in the CM 30Y.

As indicated by the curve 60, the liquid lens 22 in the optical system 21 in the LM 20A has the refractive power that stabilizes (or reaches the target refractive power) in about 200 ms. Some liquid lenses 22 may use a longer period before the refractive power stabilizes. The preset wait period may be the period taken to stabilize the refractive power of the liquid lens 22 in the optical system 21 in every LM 20 attachable to the body module 10 (hereafter, the maximum response period). This allows the production of image data in focus with any combination of an LM 20 and a CM 30 attached to the body module 10. Setting the maximum response period to the preset wait period can prevent the controller 11 from analyzing image data out of focus and producing an erroneous analysis result. For the blur circle diameter being smaller than or equal to the pixel pitch of the imaging device 31, image data in focus can be produced before the maximum response period elapses.

More specifically, the LM 20A and the CM 30A including the imaging device 31 with a pixel pitch PA may be attached to the body module 10. The optical system 21 in the LM 20A may have a blur circle diameter changing with time as indicated by the curve 60 in response to a change in the application voltage to the liquid lens 22. As shown in FIG. 5, the optical system 21 uses 50 ms before the blur circle diameter matches PA. Thus, the wait period of 50 ms after a change in the application voltage allows the image data to be as accurate as with a longer wait period. A shorter wait period allows a single measurement with a change in the application voltage to be performed in a shorter period. The above procedure can thus adjust the preset wait period as appropriate for the combination of the lens module 20 and the imaging module 30 attached to the body module 10.

Second Embodiment

Figure 6:
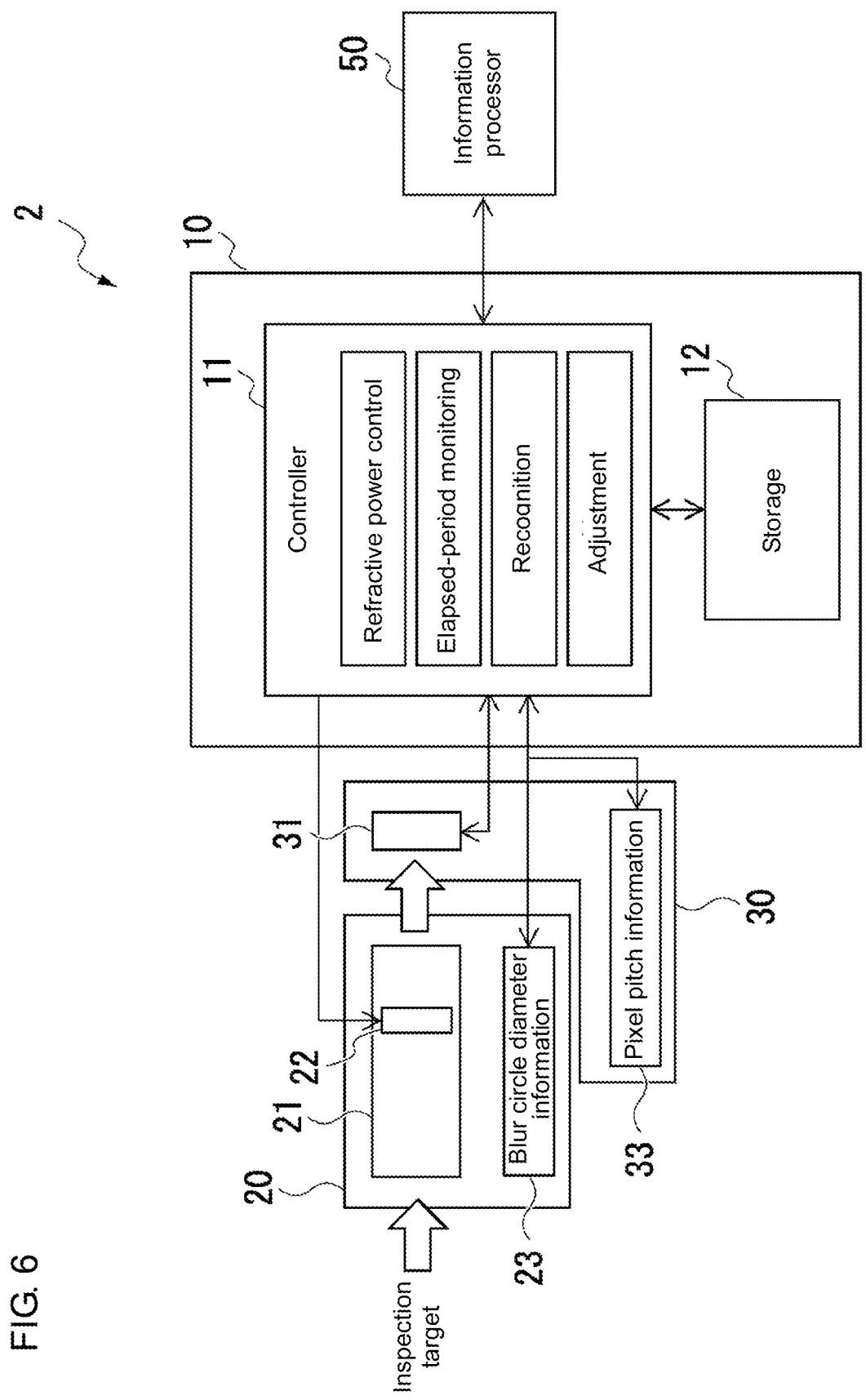
FIG. 6 is a diagram of an image sensor according to a second embodiment of the present invention.

FIG. 6 is a diagram of an image sensor 2 according to a second embodiment of the present invention.

The image sensor 2 will be described focusing on the structure and the operation different from those of the image sensor 1 (FIG. 1) according to the first embodiment.

Similarly to the image sensor 1, the image sensor 2 includes the body module 10 to which a lens module 20 and an imaging module 30 are attachable. The lens module 20 and the imaging module 30 for the image sensor 2 have the same hardware configurations as the lens module 20 and the imaging module 30 for the image sensor 1. However, the nonvolatile memory 23 in the lens module 20 for the image sensor 2 stores blur circle diameter information instead of LM format information. The nonvolatile memory 33 in the imaging module 30 for the image sensor 2 stores pixel pitch information instead of CM format information.

The blur circle diameter information stored in the nonvolatile memory 23 in a specific lens module 20 indicates the change in the blur circle diameter with time after the application voltage is applied to the liquid lens 22 in the optical system 21 in the lens module 20. The blur circle diameter information may include coefficients in an approximation function that approximates a curve indicating the relationship between the blur circle diameter and the elapsed period (refer to the curve 60 in FIG. 5), or may include the coordinates (the blur circle diameter and the elapsed period) of multiple points on the curve.

The pixel pitch information stored in the nonvolatile memory 33 in a specific imaging module 30 indicates the pixel pitch of the imaging device 31 in the imaging module 30. The pixel pitch information may indicate the pixel pitch of the imaging device 31 or a value associated with the pixel pitch.

Figure 7:
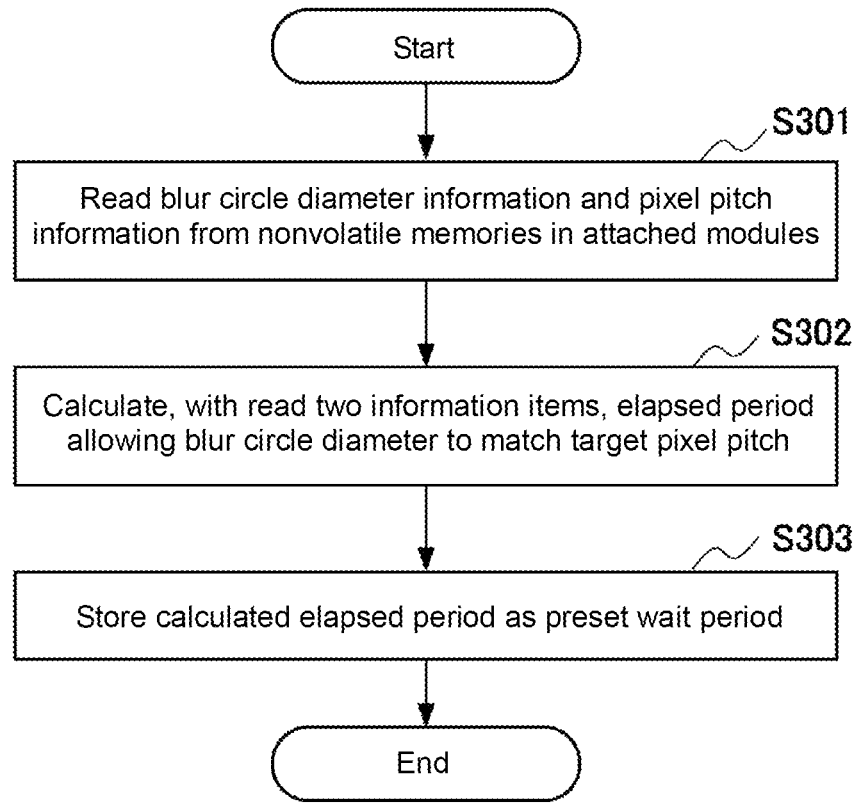
FIG. 7 is a flowchart of an adjustment process performed by a controller in the image sensor according to the second embodiment.

The body module 10 for the image sensor 2 also has the same hardware configuration as the body module 10 for the image sensor 1. However, the storage 12 in the body module 10 for the image sensor 2 includes no wait period table 15. The controller 11 in the body module 10 for the image sensor 2 (hereafter, a second controller 11) is a modification of the controller 11 in the body module 10 for the image sensor 1 to perform an adjustment process shown in FIG. 7 instead of the adjustment process (FIG. 3) described above.

More specifically, the second controller 11 starts the adjustment process (FIG. 7) when the image sensor 2 is turned on. The second controller 11 starting the adjustment process first reads blur circle diameter information from the nonvolatile memory 23 and pixel pitch information from the nonvolatile memory 33 in the modules attached to the body module 10 (step S301). The second controller 11 then calculates, using the read two items of information, the elapsed period that allows the blur circle diameter to match the pixel pitch (hereafter, a target pixel pitch) indicated by the pixel pitch information (step S302). The process in step S302 is performed in accordance with the structure (data structure) of the blur circle diameter information. More specifically, the blur circle diameter information may include coefficients in an approximation function that approximates a curve indicating the relationship between the blur circle diameter and the elapsed period. In this case, step S302 includes calculating the elapsed period by substituting the target pixel pitch into the approximation function using values included in the blur circle diameter information as coefficients. The blur circle diameter information may include the coordinates (the blur circle diameter and the elapsed period) of multiple points on a curve indicating the relationship between the blur circle diameter and the elapsed period. In this case, the elapsed period is calculated by interpolation.

After step S302, the second controller 11 stores the calculated elapsed period as a preset wait period (step S303) and ends the adjustment process.

As described above, the image sensor 2 according to the present embodiment can also adjust the preset wait period to the period taken for the optical system 21 to have a blur circle diameter matching the pixel pitch of the imaging device 31 after a change in the application voltage to the liquid lens 22. The period is the shortest to produce image data in focus. The image sensor 2 according to the present embodiment can thus adjust the preset wait period as appropriate for the combination of the lens module 20 and the imaging module 30 attached to the body module 10.

The image sensor 1 is to update the wait period table 15 in the body module 10 for incorporating one or both of a lens module 20 and an imaging module 30 in a new format. The image sensor 2 according to the present embodiment can incorporate one or both of a lens module 20 and an imaging module 30 in a new format without changing the body module 10.

Modifications

The image sensor according to the above embodiments may be modified variously. For example, although the image sensor 1 or 2 according to the above embodiments includes the imaging device 31 as a monochrome image sensing device, the imaging device 31 may be a color image sensing device. For the imaging device 31 being a single-chip color image sensing device with a Bayer array (RGB), the pixel pitch may be determined by multiplying the actual pixel pitch by a predetermined coefficient A (A>1). The image sensor 2 may be modified to allow the user to designate the accuracy of image data. The image sensor 2 may be modified to such an image sensor by, for example, modifying step S302 to calculate, using the read two items of information, the elapsed period that allows the blur circle diameter to match the dimension corresponding to the accuracy designated by the user.

Each lens module 20 may incorporate a range sensor for detecting the distance from the inspection target. In the refractive power control process, the controller 11 in the image sensor 1 or 2 may be modified to determine the application voltage to the liquid lens 22 based on the distance detected by the range sensor and apply the determined voltage to the liquid lens 22. In the refractive power control process, the controller 11 in the image sensor 1 or 2 may be modified to determine the application voltage to the liquid lens 22 based on the distance detected by a range sensor, which is located near the production line for the inspection target separately from the image sensor 1 or 2, and apply the determined voltage to the liquid lens 22.

The wait period table 15 (FIG. 4) may be stored in an external device, such as the information processor 50. The controller 11 in the image sensor 1 may be modified to transmit, to the external device, a predetermined request including LM format information read from the nonvolatile memory 23 and CM format information read from the nonvolatile memory 33. The controller 11 may then obtain the wait period from the external device. The controller 11 in the image sensor 2 may be modified to transmit, to an external device, a predetermined request including information read from the nonvolatile memories 23 and 33 and format information to request the external device to calculate the wait period (elapsed period).

The refractive power control process may be modified to apply the voltage designated by the information processor 50 (or another device) to the liquid lens 22. The refractive power control process may be modified to determine the voltage to be applied to the liquid lens 22 based on the refractive power designated by the information processor 50 (or another device) and apply the determined voltage to the liquid lens 22. The controller 11 in the image sensor 1 or 2 may be modified to receive a measurement instruction that designates the installation distance, the application voltage, or the refractive power. In response to the instruction, the controller 11 may determine whether the application voltage is to be changed. When the application voltage is to be changed, the controller 11 may perform the refractive power control process and wait for the preset wait period to elapse before performing steps S102 and S103. The controller 11 in the image sensor 1 or 2 may be modified to, in response to a measurement instruction that designates the installation distance, the application voltage, or the refractive power, perform the refractive power control process and wait for the preset wait period to elapse before performing steps S102 and S103. In response to a measurement instruction that does not designate the installation distance, the application voltage, or the refractive power, the controller 11 may immediately perform steps S102 and S103.

Figure 8:
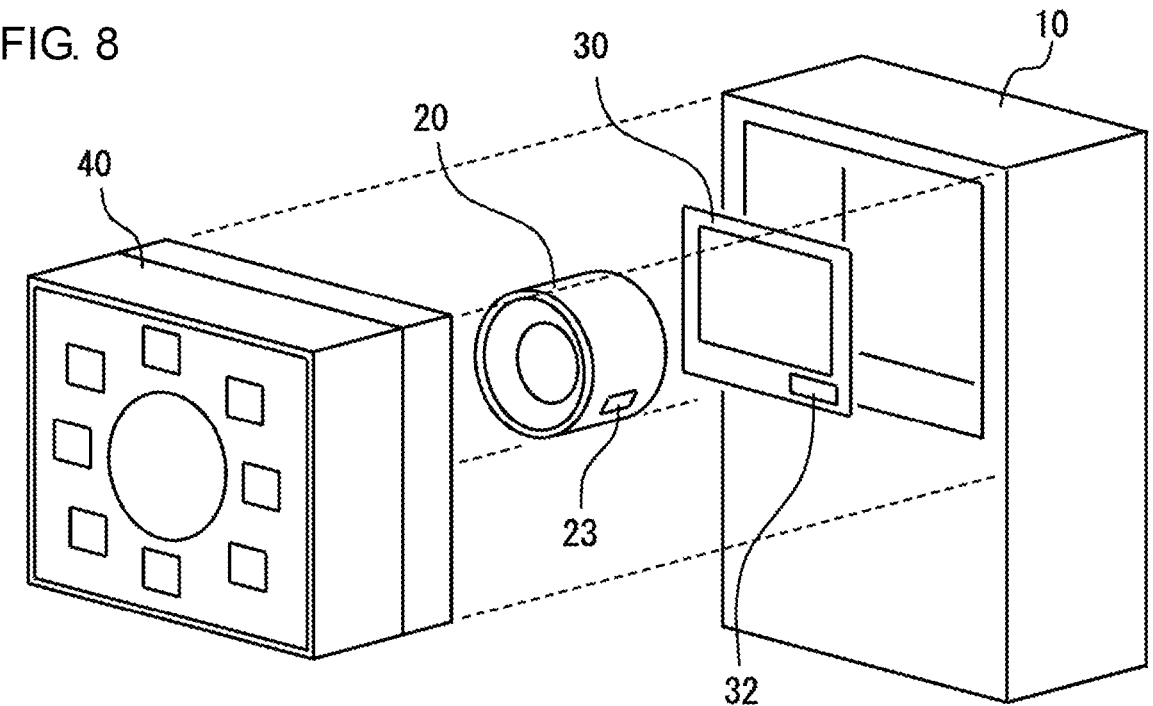
FIG. 8 is a diagram of an image sensor according to a modification of the first and second embodiments.

The controller 11 in the image sensor 1 or 2 may be modified to constantly capture image data and transmit the captured image data to the information processor 50. Each lens module 20 may be modified to include a light source (e.g., a light-emitting diode or an LED) for illuminating a subject. The body module 10 may be modified to additionally receive an illumination module 40 including a light source for illuminating a subject as schematically shown in FIG. 8.

The monochrome image sensing device in the above examples may instead be a color image sensing device. For a single-chip color image sensing device with a Bayer array (RGB), for example, the pixel pitch P may be set by multiplying the actual pixel pitch by a predetermined coefficient A (A>1).

Appendix

An image sensor (1; 2), comprising:

a body module (10) to which a lens module (20) and an imaging module (30) are attachable, the body module (10) including a refractive power controller (11) configured to adjust an application voltage applicable to a liquid lens (22) included in the lens module (20) to control a refractive power of the liquid lens (22), a recognition processor (11) configured to analyze image data from an imaging device (31) included in the imaging module (30) to recognize predetermined information about a subject, the recognition processor (11) being configured to analyze the image data after a preset period elapses from when the refractive power controller (11) changes the application voltage to the liquid lens (22), and an adjuster (11) configured to read first information from a memory (23) included in the lens module (20) and second information from a memory (33) included in the imaging module (30) and adjust, based on the read first information and the read second information, the preset period to a period corresponding to a combination of the lens module (20) and the imaging device (31), the first information indicating a specification for the lens module (20) or a type of the lens module (20), the second information indicating a specification for the imaging device (31) or a type of the imaging device (31).

REFERENCE SIGNS LIST 1, 2 image sensor
10 body module
11 controller
12 storage
15 wait period table
20 lens module
21 optical system
22 liquid lens
23, 33 nonvolatile memory
30 imaging module
31 imaging device
40 illumination module
50 information processor

The invention claimed is:

1. An image sensor, comprising:

a body module to which a lens module and an imaging module are attachable, the body module including a refractive power controller configured to adjust an application voltage applicable to a liquid lens included in the lens module to control a refractive power of the liquid lens, a recognition processor configured to analyze image data from an imaging device included in the imaging module to recognize predetermined information about a subject, the recognition processor being configured to analyze the image data after a preset period elapses from when the refractive power controller changes the application voltage to the liquid lens, and an adjuster configured to read first information from a memory included in the lens module and second information from a memory included in the imaging module and adjust, based on the read first information and the read second information, the preset period to a period corresponding to a combination of the lens module and the imaging device, the first information indicating a specification for the lens module or a type of the lens module, the second information indicating a specification for the imaging device or a type of the imaging device.

2. The image sensor according to claim 1, wherein the first information includes blur circle diameter information indicating a change in a blur circle diameter with time after the application voltage is applied to the liquid lens, the second information includes pixel pitch information indicating a pixel pitch of the imaging device, and the adjuster determines, based on the obtained blur circle diameter information and the obtained pixel pitch information, an elapsed period after the application voltage is applied to allow the blur circle diameter to be smaller than or equal to the pixel pitch indicated by the pixel pitch information, and adjusts the preset period based on the determined elapsed period.

3. The image sensor according to claim 2, wherein
the blur circle diameter information includes one or more coefficients in a relational expression indicating the change in the blur circle diameter with time after the application voltage is applied to the liquid lens.

4. The image sensor according to claim 1, wherein
the first information includes lens module format information indicating a format of the lens module, and
the second information includes imaging module format information indicating a format of the imaging module.

5. The image sensor according to claim 1, wherein
the adjuster transmits a predetermined request including the first information and the second information to an external device, obtains a period recommended as the preset period from the external device, and adjusts the preset period to the obtained recommended period.

6. The image sensor according to claim 1, wherein
the body module includes a storage storing a period recommended as the preset period for each of a plurality of combinations of the first information and the second information, and
the adjuster in the body module reads, from the storage, the recommended period associated with one of the plurality of combinations of the first information and the second information, and adjusts the preset period to the read recommended period.

7. The image sensor according to claim 4, wherein
the adjuster transmits a predetermined request including the first information and the second information to an external device, obtains a period recommended as the preset period from the external device, and adjusts the preset period to the obtained recommended period.

8. The image sensor according to claim 4, wherein
the body module includes a storage storing a period recommended as the preset period for each of a plurality of combinations of the first information and the second information, and
the adjuster in the body module reads, from the storage, the recommended period associated with one of the plurality of combinations of the first information and the second information, and adjusts the preset period to the read recommended period.

* * * * *